(12) United States Patent
Shimatani

(10) Patent No.: US 10,759,144 B2
(45) Date of Patent: Sep. 1, 2020

(54) BUILDING MATERIAL

(71) Applicant: NICHIHA CORPORATION, Nagoya-shi, Aichi (JP)

(72) Inventor: Yasuhiko Shimatani, Nagoya (JP)

(73) Assignee: NICHIA CORPORATION, Nagoya-Shi (JP)

( * ) Notice: Subject to any disclaimer, the term of this patent is extended or adjusted under 35 U.S.C. 154(b) by 0 days.

(21) Appl. No.: 16/337,782

(22) PCT Filed: Mar. 26, 2018

(86) PCT No.: PCT/JP2018/012012
§ 371 (c)(1),
(2) Date: Mar. 28, 2019

(87) PCT Pub. No.: WO2018/181115
PCT Pub. Date: Oct. 4, 2018

(65) Prior Publication Data
US 2019/0358932 A1    Nov. 28, 2019

(30) Foreign Application Priority Data

Mar. 30, 2017  (JP) ................................ 2017-068539

(51) Int. Cl.
*B32B 7/06*      (2019.01)
*B32B 27/28*    (2006.01)
(Continued)

(52) U.S. Cl.
CPC .............. *B32B 7/06* (2013.01); *B32B 27/285* (2013.01); *B32B 27/32* (2013.01); *E04C 2/52* (2013.01);
(Continued)

(58) Field of Classification Search
CPC ......... B32B 7/06; B32B 27/285; B32B 27/32; E04C 2/52; E04C 2/04; E04F 13/075; E04F 13/08
See application file for complete search history.

(56) References Cited

U.S. PATENT DOCUMENTS 8,281,535 B2 * 10/2012 Chen ...................... B28B 11/04
                                                                        428/41.7
8,297,018 B2 * 10/2012 Peng ...................... B28B 11/04
                                                                        52/446
(Continued)

FOREIGN PATENT DOCUMENTS

JP      2006-104874 A    4/2006
JP      2013-163764 A    8/2013
(Continued)

OTHER PUBLICATIONS

English translation of the International Search Report, dated Jun. 5, 2018, for International Application No. PCT/JP2018/012012.

*Primary Examiner* — Beth A Stephan
(74) *Attorney, Agent, or Firm* — Birch, Stewart, Kolasch & Birch, LLP

(57) ABSTRACT

[Object] To provide a building material capable of solving the problem of peeling-off, turning-up, and displacement of a protective sheet from a coating during storage, transport, and construction and capable of solving the problem of degradation of surface finishing of the coating as a result of the protective sheet being peeled off from a coating surface of the building material.
[Solution] A building material 10 includes a base material 1 having a design surface on a surface thereof, a coating 2 that is formed on the design surface and that has a surface having a 60-degree specular gloss of 80 or greater, and a protective sheet 3 affixed to the coating 2 so as to be peelable. The
(Continued)

coating 2 has a pencil hardness of HB or higher. The adhesive force between the coating 2 and the protective sheet 3 is 2 to 8 N/20 mm.

2 Claims, 6 Drawing Sheets

(51) Int. Cl.
   *B32B 27/32* (2006.01)
   *E04C 2/52* (2006.01)
   *E04F 13/075* (2006.01)
   *E04F 13/08* (2006.01)

(52) U.S. Cl.
   CPC ............ *E04F 13/075* (2013.01); *E04F 13/08* (2013.01); *B32B 2451/00* (2013.01)

(56) References Cited

U.S. PATENT DOCUMENTS

| | | |
|---|---|---|
| 2014/0377540 A1 | 12/2014 | Ishiguro et al. |
| 2015/0004404 A1 | 1/2015 | Senda et al. |
| 2015/0072142 A1 | 3/2015 | Senda et al. |
| 2016/0289128 A1* | 10/2016 | Murase ............... C04B 41/52 |
| 2017/0145569 A1* | 5/2017 | Hara ..................... B05D 1/02 |

FOREIGN PATENT DOCUMENTS

| | | |
|---|---|---|
| JP | 2016-5879 A | 1/2016 |
| JP | 2016-5884 A | 1/2016 |
| JP | 2016-188492 A | 11/2016 |
| JP | 1598501 S | 2/2018 |
| JP | 1598586 S | 2/2018 |
| JP | 1598587 S | 2/2018 |
| WO | WO 2010/067787 A1 | 6/2010 |
| WO | WO 2014/208564 A1 | 12/2014 |

\* cited by examiner

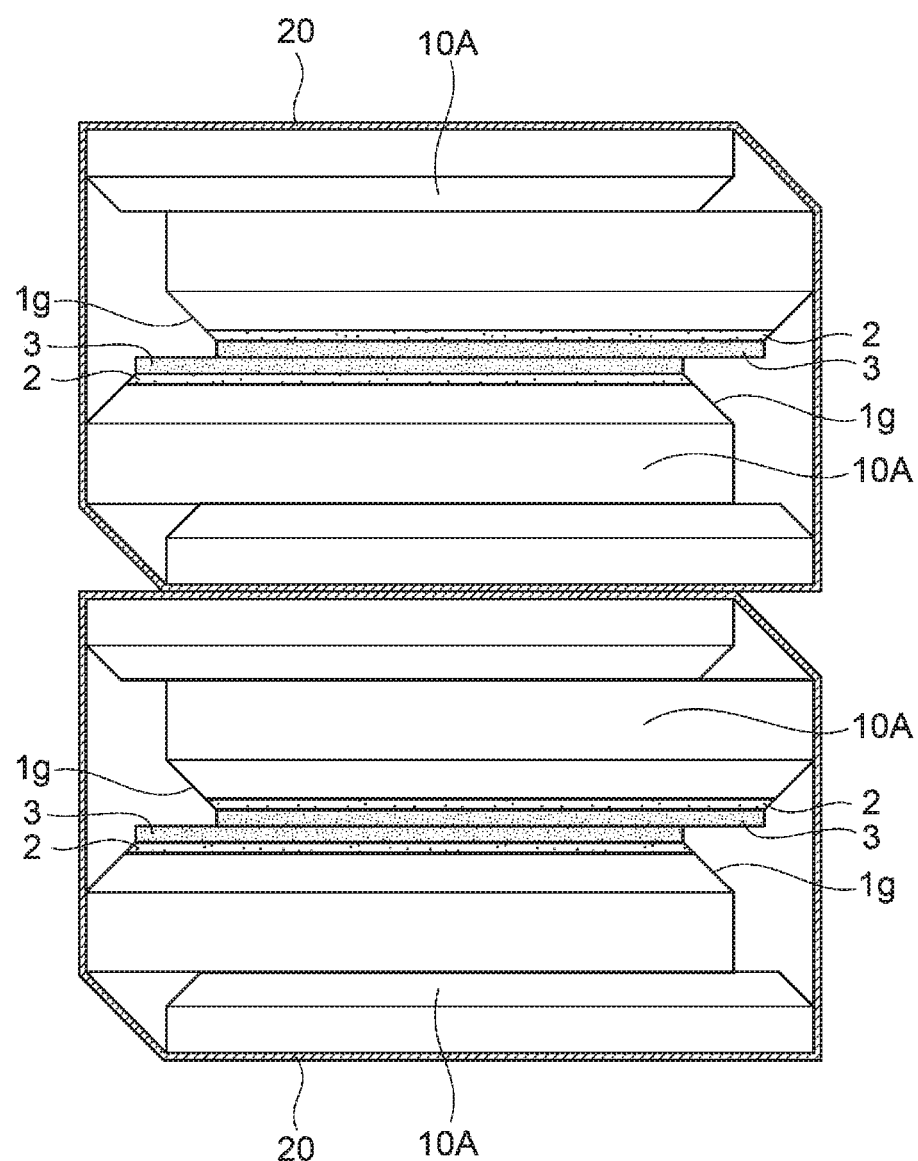

BUILDING MATERIAL

TECHNICAL FIELD

The present invention relates to a building material, such as a siding board.

BACKGROUND ART

Building materials for forming exterior walls and interior walls of buildings include ceramic siding boards, metal siding boards, and ALC (autoclaved lightweight aerated concrete) boards.

Recently, requirements for exterior design of the aforementioned building materials have increased. As one measure for such requirements, mirror finishing, in which surfaces of building materials are finished into smooth glossy faces like a mirror, has been examined.

PTL 1 discloses a building material provided with a mirror-finished coating. The building material includes a first mirror coating and a second mirror coating formed on a surface of a base material.

Building materials are typically stored and transported in a state in which a plurality of building materials are stacked on each other. The surfaces of the building materials are protected with packing sheets and protective sheets to prevent the surfaces of the building materials from being damaged during storage and transport.

Meanwhile, to prevent the surfaces of building materials from being damaged during construction of the building materials into a building, it is desired that the construction be performed in a state in which the surfaces of the building materials are protected.

PTL 2 describes affixing a protective layer (protective sheet), such as a packing sheet, to a surface of a coating of a building material that is a fiber-cement component. PTL 2 describes that an adhesive force between the coating and the protective sheet is set to 15 to 190 g/inch (converted to 0.12 to 1.47 N/20 mm).

CITATION LIST

Patent Literature

PTL 1: Japanese Unexamined Patent Application Publication No. 2016-188492
PTL 2: U.S. Pat. No. 8,281,535

SUMMARY OF INVENTION

Technical Problem

For example, it may become possible, by affixing the protective sheet described in PTL 2 to the surface of the building material described in PTL 1 or the like, to prevent the surface of the building material from being damaged during storage, transport, and construction of the building material.

However, when the protective sheet described in PTL 2 is affixed to the surface of the coating of the building material described in PTL 1 or the like, there is a concern, because the adhesive force of the protective sheet described in PTL 2 with respect to a mirror-finished coating is too weak, that the protective sheet may peel off due to wind or the like and that the surface of the coating may be exposed during storage and transport of the building material as a result of the protective sheet being turned up or displaced.

A measure of employing a protective sheet that has a strong adhesive force with respect to a coating of a mirror-finished building material may be considered. However, employing a protective sheet having a strong adhesive force leads to a concern about an another problem of deformation of the surface form of a coating as a result of the coating being pulled when the protective sheet is peeled off from the coating surface of a building material. Surface smoothness is important, in particular, for mirror-finished coatings. Mirror finishing is degraded due to even a slight change in the surface form of a coating.

The present invention was developed in consideration of the aforementioned problem. An object of the present invention is to provide a building material capable of solving the problem of peeling-off, turning-up, and displacement of a protective sheet from a coating during storage, transport, and construction and capable of solving the problem of degradation of surface finishing of a coating as a result of the protective sheet being peeled off from a coating surface of the building material.

Solution to Problem

To achieve the aforementioned purpose, a building material according to a first aspect of the present invention includes a base material that has a design surface on a surface thereof, a coating that is formed on the design surface and that has a surface having a 60-degree specular gloss of 80 or greater, and a protective sheet affixed to the coating so as to be peelable, in which the coating has a pencil hardness of HB or higher, and in which an adhesive force between the coating and the protective sheet is 2 to 8 N/20 mm.

According to the building material of the first aspect of the present invention, due to the adhesive force between the coating and the protective sheet being 2 N/20 mm or greater, it is possible to solve the problem of peeling-off of the protective sheet from the coating surface during storage, transport, and construction of the building material, which enables the building material to acquire excellent construction properties.

In addition, due to the adhesive force between the coating and the protective sheet being 8 N/20 mm or less and the pencil hardness of the coating being HB or higher, that is, hard, it is possible to solve the problem of deformation of the coating surface when the protective sheet is peeled off from the coating surface. Here, the "pencil hardness" is a hardness that is measured on the basis of JIS K5600 scratch hardness test (pencil method). High hardness does not simply provide excellent performance with high-scratch resistance and high solidness. Product performance may even be degraded because flexibility decreases as hardness increases, and a crack may be easily generated in a coating during construction and transport. The range of the pencil hardness includes 6B to 9H in this order from soft.

Accordingly, it is possible to maintain the 60-degree specular gloss of the coating surface to be 80 or greater and possible to assure mirror-like smoothness, even after the protective sheet is peeled off from the coating surface.

When the 60-degree specular gloss of the coating surface is 80 or greater, the coating surface is smooth and exerts mirror-like glossiness. In contrast, when the 60-degree specular gloss exceeds 90, glossiness when the building material is constructed as a wall material becomes excessive. It is thus preferable that the 60-degree specular gloss of the coating surface be set in a range of 80 to 90 when the building material is applied to a wall material.

Here, examples of the 'base material' constituting the building material include, for example, a ceramic siding containing cement as a main component, an ALC board, a metal siding containing metal as a main component, a resin board, and the like.

In addition, the 'coating' is formed by, for example, applying a paint constituted by an acrylic resin, a urethane resin, a fluororesin, an ultraviolet-curing resin, or the like onto a surface of a base material and drying the paint. Only a paint of one type may be used, or the coating may be formed by applying paints of a plurality of types sequentially onto the surface of the base material and drying the paints.

Moreover, as the 'protective sheet', a stack of, for example, a base layer formed from polyethylene or the like and a synthetic rubber-based adhesive layer is applicable.

In a second aspect of the building material according to the present invention, the protective sheet has a fracture strength of 35 to 60 MPa.

Due to the fracture strength of the protective sheet being 35 MPa or greater, there is less risk that the protective sheet is fractured when being peeled off from the coating surface, even though the adhesive force between the coating and the protective sheet is 2 N/20 mm or greater, that is, strong, which enables the building material to exert excellent construction properties.

From a point of view of assuring the aforementioned fracture strength of the protective sheet and protecting the coating surface, a protective sheet having a thickness of 40 to 100 μm is preferably employed.

In addition, in a third aspect of the building material according to the present invention, the design surface includes a covered region, to which the protective sheet is affixed, and an exposed region, to which the protective sheet is not affixed, the exposed region extending along one end of the design surface.

When ends of the design surface are subjected to chamfering, inner ends and outer ends of a chamfered portion become present. The exposure region is a region (that is, the chamfered portion) between the inner ends and the outer ends of the chamfered portion, while the exposed region may include a region having a predetermined width inside the inner ends of the chamfered portion.

Due to the design surface including the exposed region, to which the protective sheet is not affixed, extending along the one end, it is possible to further reduce the possibility that the protective sheet interferes with the building material adjacent thereto during construction.

Advantageous Effects of Invention

According to a building material of the present invention, it is possible to solve the problem of peeling-off, turning-up, and displacement of a protective sheet from a coating during storage, transport, and construction of the building material and possible to solve the problem of degradation of surface finishing of the coating as a result of the protective sheet being peeled off from the coating surface of the building material, which enables the building material to exert excellent construction properties.

BRIEF DESCRIPTION OF DRAWINGS

FIG. 6 is a schematic view illustrating a state in which a plurality of the building materials according to the second embodiment in a stacked orientation are stored and transported.

DESCRIPTION OF EMBODIMENTS

Hereinafter, first and second embodiments of a building material according to the present invention will be described with reference to the drawings. The base material in illustrated examples is commonly known as a four-side shiplap base material, which has a quadrilateral shape and has joining portions at four sides. However, as a matter of course, the building material of the present invention may be constituted by a base material having a shape other than the above.

First Embodiment

Figure 1:
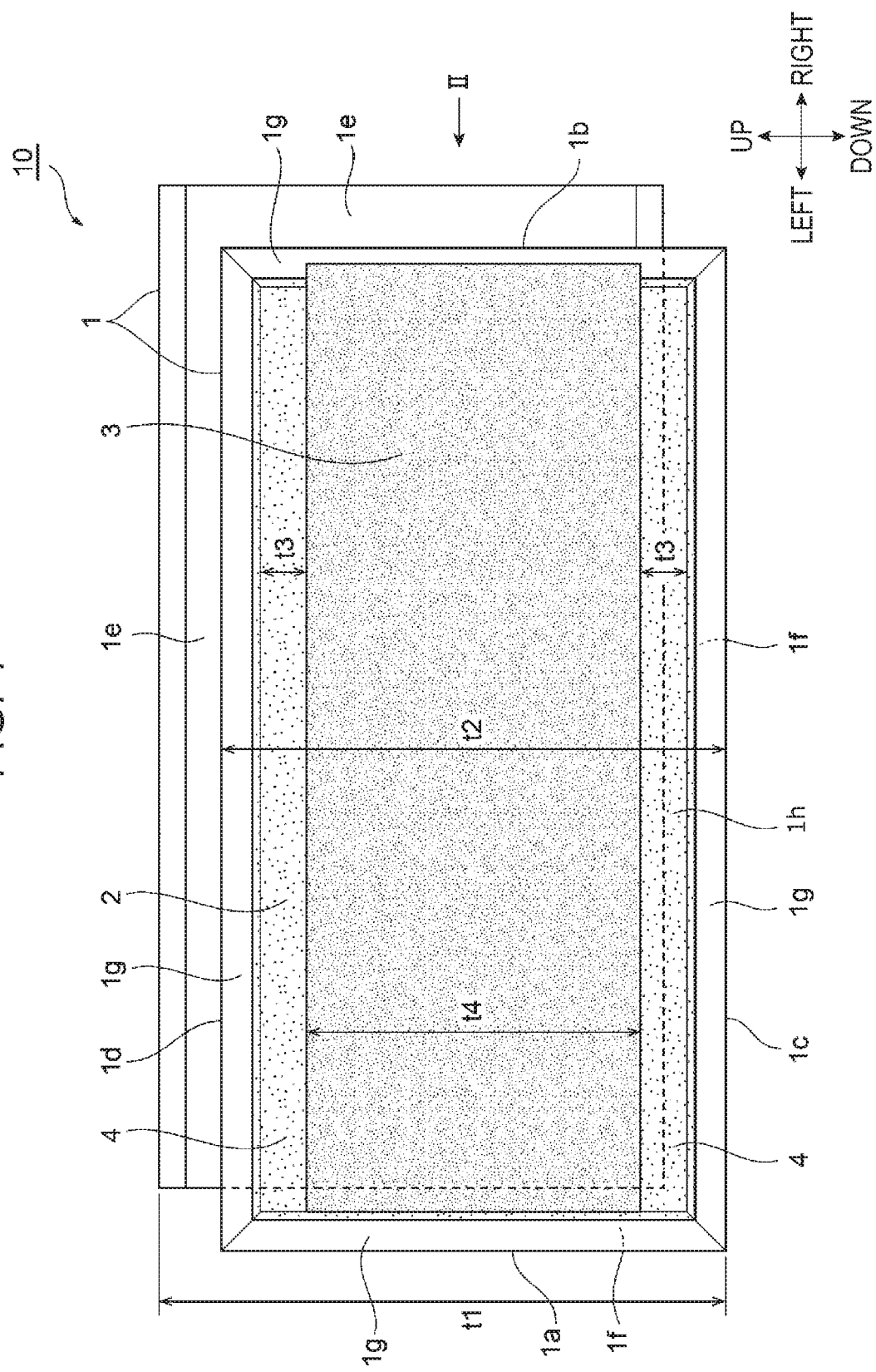
FIG. 1 is a plan view of a building material according to a first embodiment of the present invention as viewed from a front surface, which is on the side of a design surface, of a base material.
Figure 2:
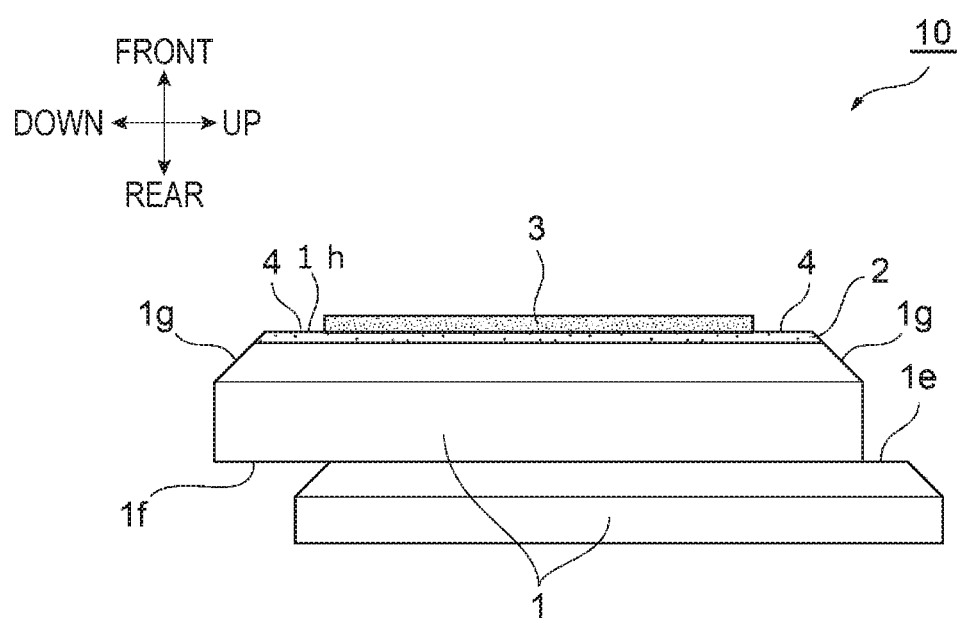
FIG. 2, which is a view of FIG. 1 as viewed in arrow II direction, is a right side view of the building material according to the first embodiment.

The arrows indicating up, down, right, and left in FIG. 1 and the arrows indicating front, rear, up, and down in FIG. 2 indicate orientation directions of ends and surfaces of a building material 10.

The building material 10 is an exterior-wall material and generally constituted by a base material 1 that has a design surface on a surface thereof, a coating 2 formed on a surface of the design surface, and a protective sheet 3 affixed to a surface of the coating 2. The building material 10 is a rectangular plate material having a left-right dimension of about 1600 to about 2000 mm and an up-down dimension t1 of about 460 to about 480 mm.

The base material 1 is formed of a ceramic siding (a wood-fiber reinforced cement board, a fiber reinforced cement board, a fiber reinforced cement/calcium silicate board, a slag plaster board, or the like) containing cement as a main component, an ALC (autoclaved lightweight aerated concrete) board, a metal siding containing metal as a main component, a resin board, or the like.

The base material 1 has a rectangular shape and has the design surface on the surface thereof, the design surface being a glossy flat surface of the exterior-wall material. The base material 1 is a four-side shiplap plate material including joining portions at four sides.

The design surface includes a quadrilateral flat surface 1h and a chamfered portion 1g that surrounds the four sides of the flat surface 1h.

A left end of the chamfered portion 1g formed on the left side of the flat surface 1h is a left end 1a of the design surface, and a right end of the chamfered portion 1g formed on the right side of the flat surface 1h is a right end 1b of the design surface.

A lower end of the chamfered portion 1g formed on the lower side of the flat surface 1h is a lower end 1c of the design surface, and an upper end of the chamfered portion 1g formed on the upper side of the flat surface 1h is an upper end 1d of the design surface.

A rear-surface-side joining portion 1e that projects outward on the rear-surface side is formed outside the right side and the upper side of the design surface. Specifically, the rear-surface-side joining portion 1e that is recessed from the right end 1b and the upper end 1d of the design surface toward a rear surface and that projects outward on the rear-surface side is formed.

A front-surface-side joining portion 1f that is concave inward on the rear-surface side is formed inside the left side and the lower side of the design surface. Specifically, the front-surface-side joining portion 1f that extends from the left end 1a and the lower end 1c of the design surface toward the rear surface and that is concave inward on the rear-surface side is formed.

The shape of the rear-surface-side joining portion 1e and the shape of the front-surface-side joining portion 1f are joinable to each other by a shiplap joint.

In other words, in construction using the building materials 10, the rear-surface-side joining portion 1e of one building material 10 is overlapped by the front-surface-side joining portion 1f of another building material 10 adjacent thereto, and the front-surface-side joining portion if and the rear-surface-side joining portion 1e are thereby joined to each other by a shiplap joint.

A paint constituted by an acrylic resin, a urethane resin, a fluororesin, an ultraviolet-curing resin, or the like is used to form the coating 2 on the design surface of the base material 1. The coating 2 is formed by applying a paint of one type onto a surface of the base material and drying the paint or may be formed by applying paints of a plurality of types sequentially onto the surface of the base material and drying the paints.

The coating 2 is formed on the flat surface 1h of the base material 1 and on the chamfered portion 1g surrounding the four sides of the flat surface 1h. Specifically, the coating 2 is formed so as to extend over the entire surface of the flat surface 1h and a portion of the chamfered portion 1g at the four sides of the flat surface 1h.

The surface of the coating 2 has a 60-degree specular gloss of 80 or greater and has a pencil hardness of HB or higher. The range of the pencil hardness includes 6B to 9H in this order from soft.

The protective sheet 3 is affixed to the surface of the coating 2. The protective sheet 3 has a stacked structure of a base layer and an adhesive layer. The adhesive layer is affixed to the surface of the coating 2.

The base layer constituting the protective sheet 3 is formed of polyethylene, polypropylene, polyolefin, polyvinyl chloride, non-woven fabric, paper, or the like. The adhesive layer is formed of a synthetic rubber adhesive or an acrylic adhesive. The adhesive layer may be formed through application with respect to a sheet-shaped base layer or may be formed by extruding a sheet-shaped base layer and an adhesive-layer formation material together.

The fracture strength of the protective sheet 3 is set in a range of 35 to 60 MPa. The thickness of the protective sheet 3 is set in a range of 40 to 100 μm.

The protective sheet 3 is affixed to the surface of the coating 2 of the base material 1 by the following method (not illustrated). In the method, the protective sheet 3 wound into a roll is disposed above the base material 1, one end of the protective sheet 3 is affixed to the surface of the coating 2, and the base material 1 is placed between an upper-lower pair of pinching rollers to affix the protective sheet 3 to the surface of the coating 2 of the base material 1 during a process of passing the base material 1 between the pinching rollers.

The protective sheet 3 has a quadrilateral shape. The protective sheet 3 has a left-right width that is wider than the left-right width of the flat surface 1h and narrower than the left-right width of the design surface. The protective sheet 3 has an up-down width t4 that is narrower than the up-down width of the flat surface 1h. The protective sheet 3 is affixed to the coating 2 formed on the flat surface 1h so as to cover the surface of the coating 2.

Specifically, a left end of the protective sheet 3 is affixed to the coating 2 so as to be aligned with a left end of the flat surface 1h.

The protective sheet 3 is affixed to the coating 2 such that a right end of the protective sheet 3 is located between a right end of the flat surface 1h and the right end 1b of the chamfered portion 1g adjacent thereto and located away from the surface of the chamfered portion 1g.

A lower end of the protective sheet 3 is affixed to the coating 2 so as to be located inside a lower end of the flat surface 1h. The lower end of the protective sheet 3 and the lower end of the flat surface 1h are parallel to each other and spaced from each other by a distance t3. In other words, an exposed region 4, to which the protective sheet 3 is not affixed, is present between the lower end of the protective sheet 3 and the lower end of the flat surface 1h.

The exposed region 4 extends along the lower end 1c of the design surface.

An upper end of the protective sheet 3 is affixed to the coating 2 so as to be located inside an upper end of the flat surface 1h. The upper end of the protective sheet 3 and the upper end of the flat surface 1h are parallel to each other and spaced from each other by the distance t3. In other words, the exposed region 4, to which the protective sheet 3 is not affixed, is present between the upper end of the protective sheet 3 and the upper end of the flat surface 1h.

The exposed region 4 extends along the upper end 1d of the design surface.

The protective sheet 3 is not affixed to a surface region of the coating of the chamfered portion 1g at the four sides of the flat surface 1h. Thus, the surface region is also the exposed region 4.

Accordingly, the coating of the design surface includes a covered region, to which the protective sheet 3 is affixed, and the exposed region 4, to which the protective sheet 3 is not affixed.

In the building material 10, the adhesive force between the coating 2 and the protective sheet 3 is set in a range of 2 to 8 N/20 mm.

Due to the adhesive force between the coating 2 and the protective sheet 3 being 2 N/20 mm or greater, the protective sheet 3 does not easily peel off from the surface of the coating 2 during storage, transport, or construction of the building material 10. Moreover, due to the adhesive force between the coating 2 and the protective sheet 3 being 8 N/20 mm or less and the pencil hardness of the coating 2 being HB or higher, that is, hard, it is possible to solve the problem of deformation of the surface of the coating 2 as a result of the protective sheet 3 being peeled off from the surface of the coating 2. Therefore, even after the protective sheet 3 is peeled off from the surface of the coating 2, it is possible to maintain the 60-degree specular gloss of the surface of the coating 2 at 80 or greater and maintain mirror-like smoothness.

In addition, due to the fracture strength of the protective sheet 3 being 35 MPa or greater, it is possible to peel off the protective sheet 3 from the surface of the coating 2 without fracturing the protective sheet 3, even though the adhesive force between the coating 2 and the protective sheet 3 is 2 N/20 mm or greater, that is, strong.

When the building material 10 is viewed from the front-surface side, the protective sheet 3 fits within the dimensions of the design surface of the base material 1. Thus, even when a wind blows from the rear-surface side of the building material 10 during construction, the protective sheet 3 is not easily peeled off by the wind.

In addition, due to the protective sheet 3 being affixed to the surface of the coating 2 in a form that does not protrude over the rear-surface-side joining portion 1e and including an appropriate amount of the exposed region 4, the protective sheet 3 is prevented from becoming difficult to peel off as a result of the protective sheet 3 being caught between the building materials 10 adjacent to each other during construction.

Moreover, as illustrated in FIG. 1, due to the right end of the protective sheet 3 being located inside the right end 1b of the design surface and not being affixed to the chamfered portion 1g, it is possible to easily peel off the protective sheet 3 after construction by holding a right end of the protective sheet.

Referring to FIG. 1, dimension t1 is set to about 460 mm to about 480 mm, dimension t2 is set to about 450 mm to about 460 mm, dimension t3 is set to about 0 mm to about 2.5 mm, and dimension t4 is set to about 445 mm to about 460 mm.

Figure 3:
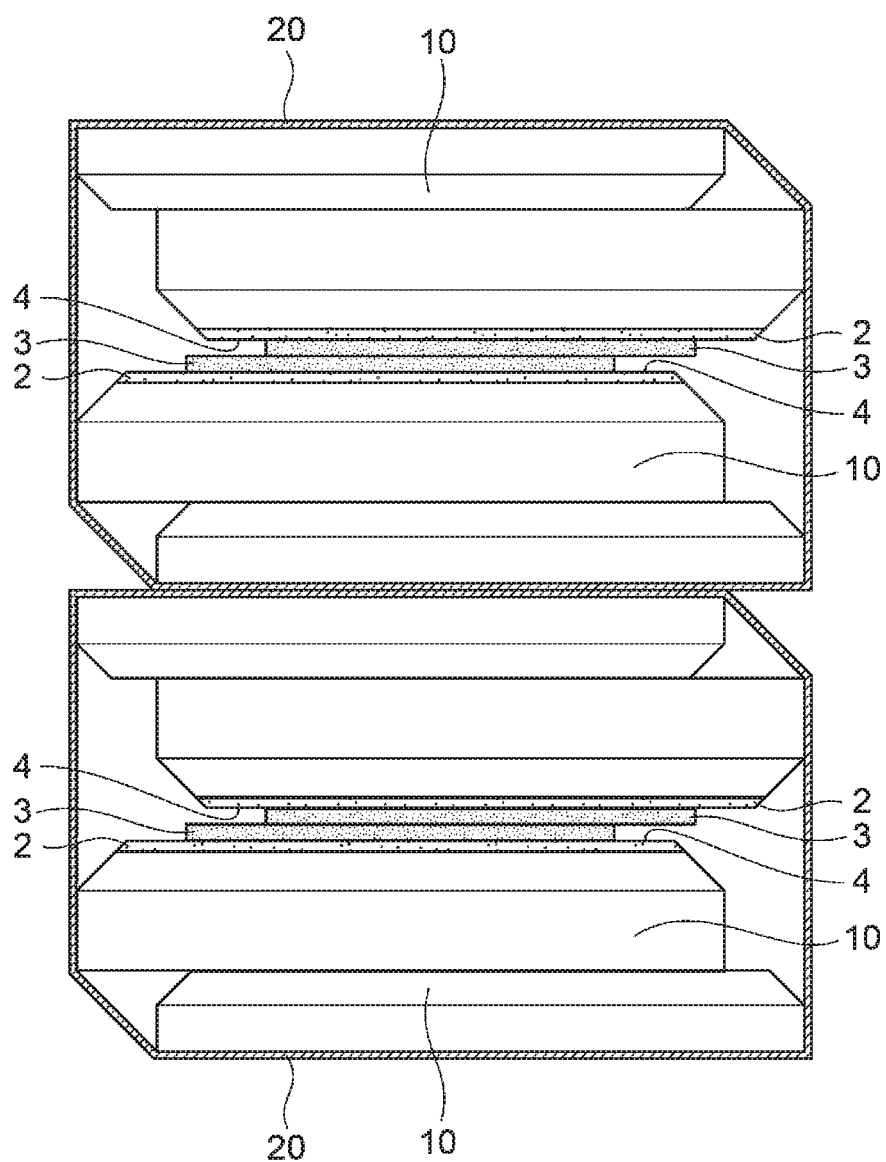
FIG. 3 is a schematic view illustrating a state in which a plurality of the building materials according to the first embodiment in a stacked orientation are stored and transported.

Next, with reference to FIG. 3, a state in which a plurality of the building materials 10 are stored and transported in a stacked orientation.

In the illustrated example, two building materials 10 are packed in a stacked state with respective surfaces facing each other. More specifically, the two building materials 10 are positioned such that the respective surfaces face each other to cause respective protective sheets 3 to be in contact with each other and such that the exposed region 4 of one of the building materials 10 faces the protective sheet 3 of the other one of the building materials 10. The two building materials 10 are bound together with a binding material 20.

As the binding material, a resin band, such as a polypropylene band or a polyethylene band, a resin film, such as a stretch film or a shrink film, a paper band, a fabric band, or the like is usable.

Due to the exposed region 4 of one of the building materials 10 facing the protective sheet 3 of the other one of the building materials 10, each of the exposed regions 4 (the exposed coating 2) of the two building materials 10 is protected by the protective sheet 3 opposite thereto.

Second Embodiment

Figure 4:
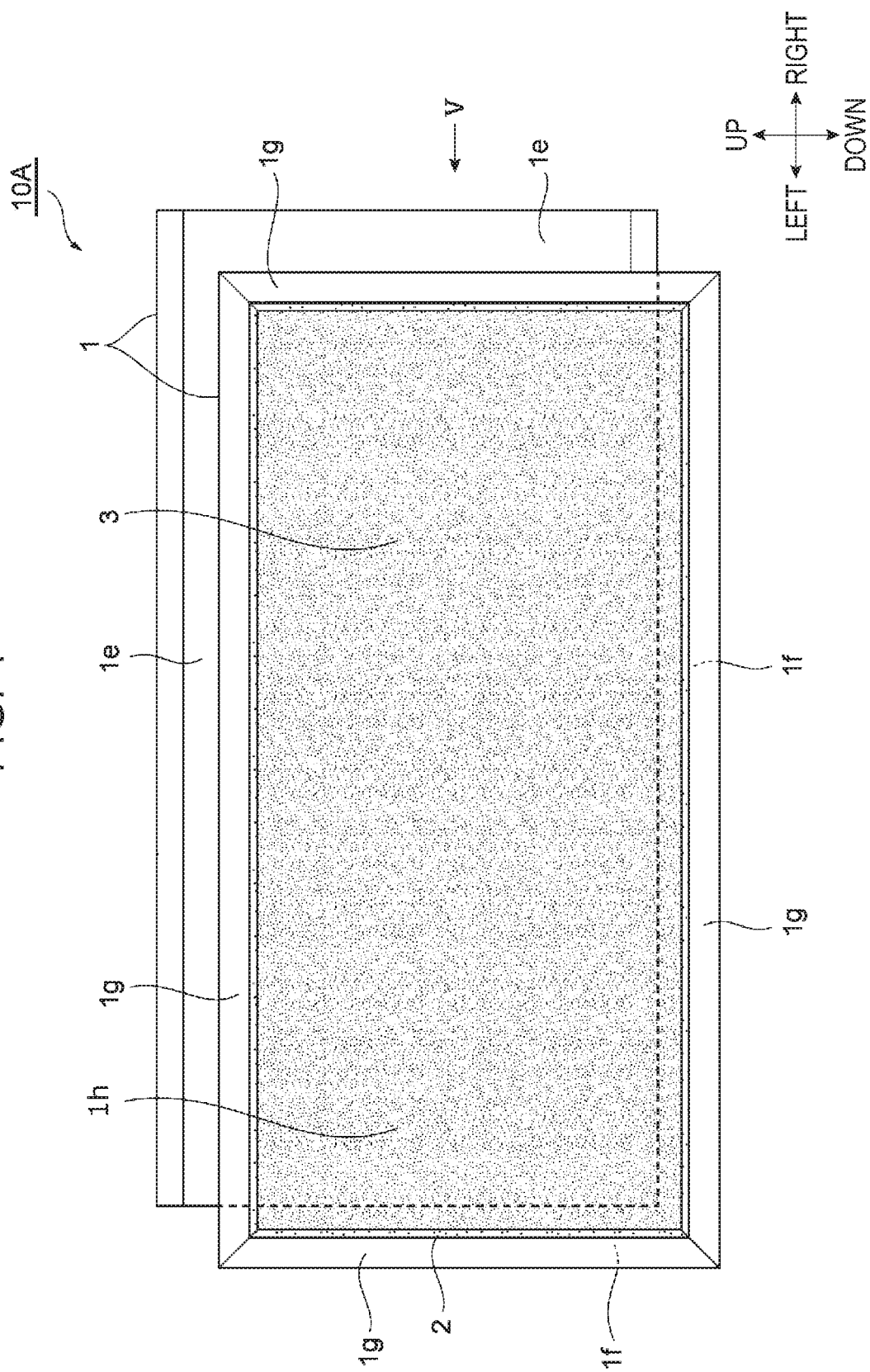
FIG. 4 is a plan view of the building material according to a second embodiment of the present invention, as viewed from the front surface, which is on the side of the design surface, of the base material.
Figure 5:
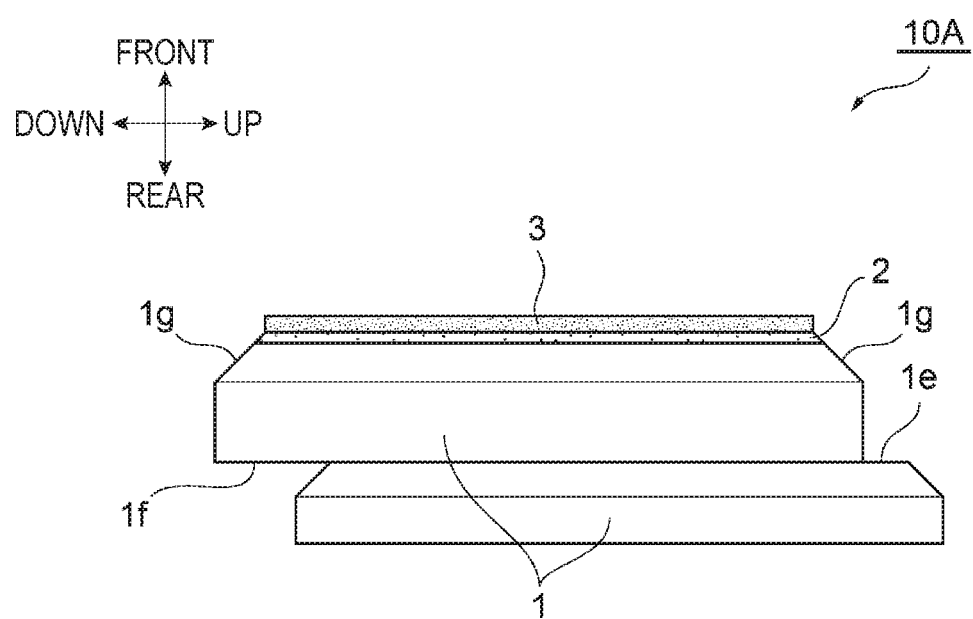
FIG. 5, which is a view of FIG. 4 as viewed in arrow V direction, is a right side view of the building material according to the second embodiment.

A building material 10A illustrated in FIGS. 4 and 5 differs from the building material 10 in terms of the size of the protective sheet 3 and a feature of the protective sheet 3 of being only affixed to the entire surface of the coating 2 of the flat surface 1h (a feature of the flat surface 1h of not including the exposed region 4). The building material 10A is identical to the building material 10 in terms of other features.

The building material 10A does not make it possible to easily peel off the protective sheet 3 by holding the right end of the protective sheet 3. However, the building material 10A is capable of exerting other effects similarly to the building material 10.

FIG. 6 illustrates a state in which a plurality of the building materials 10A are stored in a stacked orientation with respective surfaces facing each other. Referring to FIG. 6, two building materials 10A are positioned such that the chamfered portion 1g of one of the building materials 10A faces the protective sheet 3 of the other one of the building materials 10A in a state in which the protective sheets 3 of the two building materials 10A are in contact with each other. The two building materials 10A are bound together with the binding material 20.

Also in the illustrated example, the exposed region (the chamfered portion 1g) of one of the building materials 10A faces the protective sheet 3 of the other one of the building material 10A. Thus, even when the exposed region of one of the building materials nearly comes into contact with the other one of the building materials as a result of the other one of the building materials inclining with respect to the one of the building materials during packing or unpacking, each of the exposed regions is protected by the protective sheet 3 opposite thereto.

(Verification Experiments and Results of Experiments)

The inventors created various types of building materials and carried out experiments to evaluate various types of performance and the like of coatings, protective sheets, and the like constituting the building materials.

<Test Conditions>

An ultraviolet-curing acrylic resin paint of 130 to 220 g/m$^2$, a urethane resin paint of 90 to 130 g/m$^2$, and a fluororesin paint of 90 to 130 g/m$^2$ were applied in this order onto a surface of a base material that is formed of a wood cement board and that has the shape illustrated in FIG. 1, and each of the paints was dried to form a coating. Then, a protective sheet was affixed to the coating. A base layer of each protective sheet of samples 2, 6, 9, and 11 was formed from polyethylene, a base layer of each protective sheet of samples 1, 3, 4, 5, 8, and 10 was formed from polyolefin, and a base layer of each protective sheet of samples 7 and 12 was formed from another polyolefin. An adhesive layer of each protective sheet of all of the samples was formed from a synthetic rubber adhesive, and the adhesive force of each sample was adjusted by changing the thickness and the composition of the adhesive layer. The protective sheet was affixed in a form identical to the affixed form of the building material 10 illustrated in FIG. 1. Hereinafter, evaluation methods will be described. The test results are indicated in Table 1.

<Evaluation Method>

The samples described below were subjected to tests, measurement, and the like to evaluate various types of performance.

[Pencil Hardness of Coating]

Presence/absence and the degree of abrasion on a coating surface were evaluated through measurement in line with JIS K5600 scratch hardness test (pencil method).

[60-Degree Specular Gloss of Coating Surface]

In line with JIS K5600-4-7, the 60-degree specular gloss of the outermost surface of the coating of each sample was measured with use of a handy gloss checker (IG-320 manufactured by HORIBA, Ltd). In the verification experiments, the 60-degree specular gloss of the outermost surface of each coating was measured before the protective sheet was affixed thereto and after the protective sheet was peeled off therefrom. The numerical values in the table indicate values of the 60-degree specular gloss. In the table, "○" indicates that the 60-degree specular gloss was 80 or greater (excellent), and "x" indicates that the 60-degree specular gloss was less than 80 (improper).

[Fracture Strength of Protective Sheet]

With use of a tension tester, each protective sheet was pulled at a speed of 200 mm/sec. to measure a strength at which the protective sheet was fractured.

[Adhesive Force Between Coating and Protective Sheet]

Each protective sheet affixed to a coating was pulled with use of a tension tester at a speed of 0.3 m/min. to measure a strength at which the protective sheet was peeled off.

[Wind Resistance Test]

Air was caused to blow onto test bodies at a force of 10 m/sec., and the state of each test body was observed. In the table, "○" indicates that looseness, peeling-off, or the like of the protective sheet was not observed (excellent) in the observation, and "x" indicates that looseness, peeling-off, or the like of the protective sheet was observed (improper) in the observation.

<Test Results>

TABLE 1

|  |  | Sample | | | | | | | | | | | |
| --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 |
| Coating (Before Affixing Protective Sheet) | Pencil Hardness of Coating | HB | H | F | H | HB | HB | H | HB | H | B | HB | H |
|  | 60-degree Specular Gloss of Coating Surface | 83 | 83 | 83 | 83 | 83 | 83 | 83 | 83 | 83 | 83 | 83 | 83 |
| Protective Sheet | Fracture Strength of Protective Sheet | 50 | 35 | 50 | 50 | 50 | 35 | 60 | 50 | 35 | 50 | 35 | 60 |
|  | Thickness | 50 | 50 | 50 | 50 | 50 | 50 | 50 | 50 | 50 | 50 | 50 | 50 |
| Adhesive Force between Coating and Protective Sheet |  | 2 | 2 | 4 | 5 | 6 | 8 | 8 | 1 | 1 | 5 | 9 | 9 |
| Test Result | Fracture of Protective Sheet | ○ | ○ | ○ | ○ | ○ | ○ | ○ | ○ | ○ | ○ | x | x |
|  | Surface State of Coating | ○ | ○ | ○ | ○ | ○ | ○ | ○ | ○ | ○ | x | x | x |
|  | 60-degree Specular Gloss of Coating Surface | ○ | ○ | ○ | ○ | ○ | ○ | ○ | ○ | ○ | x | x | x |
|  | State of Protective Sheet after Transport | ○ | ○ | ○ | ○ | ○ | ○ | ○ | ○ | ○ | ○ | ○ | ○ |
|  | Wind Resistance Test | ○ | ○ | ○ | ○ | ○ | ○ | ○ | x | x | ○ | ○ | ○ |

[Fracture of Protective Sheet]

In the table, "x" indicates that the protective sheet was fractured (improper) during measurement of the adhesive force between the coating and the protective sheet, and "○" indicates that the protective sheet was not fractured (excellent).

[Surface State of Coating]

Two test bodies were stacked on each other such that respective protective sheets face each other. A load of 0.2 kg/cm$^2$ was applied, from above, to the test bodies in the stacked state for 48 hours. Then, the respective protective sheets were peeled off. The test bodies were placed under a fluorescent lamp to visually observe whether an adhesive trace or a transferred trace of the protective sheets was present on the coating surfaces. In the table, "○" indicates that no adhesive trace or no transferred trace of the protective sheet was observed on the coating surface (excellent) in the visual observation, and "x" indicates that an adhesive trace or a transferred trace of the protective sheet was observed on the coating surface (improper) in the visual observation.

[State of Protective Sheet after Transport]

Two test bodies were stacked on each other with respective protective sheets facing each other, and the two test bodies were bound with a binding material into one package (a form identical to that in FIG. 3). Twenty units of the packages in a state of being stacked on each other on a pallet were loaded on a vehicle and transported for about 500 km. The packages were unpacked after transport, and the state of each test body was observed. In the table, "○" indicates that displacement, breakage, or the like of the protective sheet was not observed (excellent) in the observation, and "x" indicates that displacement, breakage, or the like of the protective sheet was observed (improper) in the observation.

As indicated in Table 1, it was verified that samples 1 to 7, in which the pencil hardness of the coating surface is HB or higher and in which the adhesive force between the coating and the protective sheet is in a range of 2 to 8 N/20 mm, satisfy all evaluation items.

In contrast, samples 8 and 9, in which the adhesive force between the coating and the protective sheet is 1 N/20 mm, did not satisfy the wind resistance test.

Sample 10, in which the pencil hardness of the coating is B, did not satisfy the surface state of the coating or the 60-degree specular gloss of the coating surface after the protective sheet was peeled off.

Samples 11 and 12, in which the adhesive force between the coating and the protective sheet is 9 N/20 mm, did not satisfy the fracture of the protective sheet, the surface state of the coating, or the 60-degree specular gloss of the coating surface after the protective sheet was peeled off.

The embodiments of the present invention have been described above in detail with reference to the drawings; however, the specific configuration is not limited to these embodiments. The present invention also includes the embodiments that are subjected to design change and the like in a range not deviating from the spirit of the present invention. For example, in the first embodiment, the mirror-finished coating may not be provided on the chamfered portion 1g, and the mirror-finished coating may be provided on only the flat surface 1h. In addition, the mirror-finished coating may be provided also on the entire surface of the chamfered portion 1g. Moreover, the building material according to the present invention may be also applicable to an interior material.

REFERENCE SIGNS LIST 1 base material
1a left end 1b right end
1c lower end
1d upper end
1e rear-surface-side joining portion
1f front-surface-side joining portion
1g chamfered portion
2 coating
3 protective sheet
4 exposed region
10, 10A building material
20 binding material

The invention claimed is:

1. A building material comprising:
a base material that has a design surface on a surface thereof;
a coating that is formed on the design surface and that has a surface having a 60-degree specular gloss of 80 or greater; and
a protective sheet affixed to the coating so as to be peelable,
wherein the coating has a pencil hardness of HB or higher,
wherein a front-surface-side joining portion that is concave inward on a rear-surface side is formed inside a lower side of the design surface,
wherein a rear-surface-side joining portion that projects outward on the rear-surface side is formed outside an upper side of the design surface,
wherein the design surface has a quadrilateral flat surface and chamfered portions that surround the four sides of the quadrilateral flat surface, the quadrilateral flat surface having a width and a height,
wherein a width of the protective sheet is narrower than the width of the quadrilateral flat surface, and a height of the protective sheet is narrower than the height of the quadrilateral flat surface,
wherein the protective sheet is affixed to the coating such that i) an upper end of the protective sheet is located inside an upper end of the quadrilateral flat surface, ii) a lower end of the protective sheet is located inside a lower end of the quadrilateral flat surface, and iii) exposed regions, to which the protective sheet is not affixed to the design surface, present between the upper end of the protective sheet and the upper end of the quadrilateral flat surface and between the lower end of the protective sheet and the lower end of the quadrilateral flat surface, extend along the upper end and the lower end of the quadrilateral flat surface, and
wherein an adhesive force between the coating and the protective sheet is 2 to 8 N/20 mm.

2. The building material according to claim 1, wherein the protective sheet has a fracture strength of 35 to 60 MPa.

* * * * *